United States Patent
Lv et al.

(10) Patent No.: US 12,550,899 B2
(45) Date of Patent: Feb. 17, 2026

(54) TOPRAMEZONE DERIVATIVE AND USE THEREOF

(71) Applicant: Shandong Dehao Chemical Co., Ltd., Shandong (CN)

(72) Inventors: Zhitao Lv, Shandong (CN); Shouming Zhao, Shandong (CN); Xingxiang Gao, Shandong (CN); Zhangbin Gao, Shandong (CN); Wenjing Wu, Shandong (CN); Wenxiu Mao, Shandong (CN); Wenpeng Wu, Shandong (CN); Cai Zhang, Shandong (CN); Huijun Wang, Shandong (CN)

(73) Assignee: Shandong Dehao Chemical Co., Ltd., Weifang (CN)

( * ) Notice: Subject to any disclaimer, the term of this patent is extended or adjusted under 35 U.S.C. 154(b) by 0 days.

(21) Appl. No.: 19/075,754

(22) Filed: Mar. 10, 2025

(65) Prior Publication Data

US 2025/0302044 A1   Oct. 2, 2025

Related U.S. Application Data

(63) Continuation of application No. PCT/CN2024/091133, filed on May 6, 2024.

(30) Foreign Application Priority Data

Nov. 3, 2023 (CN) .......................... 202311455118.9

(51) Int. Cl.
*A01N 47/06* (2006.01)
*A01P 13/00* (2006.01)
*C07D 413/10* (2006.01)

(52) U.S. Cl.
CPC .............. *A01N 47/06* (2013.01); *A01P 13/00* (2021.08); *C07D 413/10* (2013.01)

(58) Field of Classification Search
CPC ............................ C07D 413/10; A01N 47/06
See application file for complete search history.

(56) References Cited

U.S. PATENT DOCUMENTS

| | | | |
|---|---|---|---|
| 6,245,716 B1 | 6/2001 | Tanaka | |
| 6,831,039 B1 | 12/2004 | Neidlein et al. | |
| 2005/0282706 A1 | 12/2005 | Coret | |
| 2010/0075855 A1* | 3/2010 | Komyoji | C07D 231/20 548/369.4 |

FOREIGN PATENT DOCUMENTS

| | | |
|---|---|---|
| AU | 6092998 A | 8/1998 |
| CN | 1250447 A | 4/2000 |
| CN | 1332738 A | 1/2002 |
| CN | 101362753 A | 2/2009 |
| CN | 101541755 A | 9/2009 |
| CN | 111285863 A | 6/2020 |
| CN | 112624973 A | 4/2021 |
| CN | 115872988 A | 3/2023 |
| CN | 117486870 A | 2/2024 |
| JP | 2005272306 A | 10/2005 |

OTHER PUBLICATIONS

First Notice of Examination Opinions Dated Mar. 12, 2024 for Corresponding Chinese Application No. 202311455118.9 along its Engligh Translation.
Qidong You. Pharmaceutical Chemistry. Chemical Industry Press, 2004, pp. 32-34.
Guiqiu Yang et al. Synthesis and Biological Activity Study of Novel 4,4-Dimethylisoxazol-3-one Derivatives. Chemistry. 2006, (Issue 12), pp. 921-925.
International Search Report and Written Opinion for Corresponding PCT Application No. PCT/CN2024/091133 Report Date: Aug. 3, 2024.

* cited by examiner

*Primary Examiner* — John Pak (57) ABSTRACT

A Topramezone derivative or an agrochemically acceptable salt thereof is provided. The Topramezone derivative is Compound I, with a name of 1-((4-(3-(4,5-dihydroisoxazol-3-yl)-2-methyl-4-(methylsulfonyl)benzoyl)-1-methyl-1H-pyrazol-5-yl)oxy)ethyl methyl carbonate, and a structural formula of:

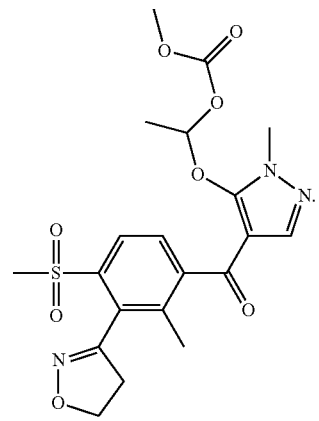

9 Claims, 4 Drawing Sheets

TOPRAMEZONE DERIVATIVE AND USE THEREOF

CROSS-REFERENCE TO RELATED APPLICATIONS

The present application is a Continuation application of PCT Application No. PCT/CN2024/091133, filed on May 6, 2024, which claims the priority of Chinese Patent Application No. 202311455118.9, filed on Nov. 3, 2023, the entire contents of which are hereby incorporated by reference.

TECHNICAL FIELD

The present invention relates to Topramezone derivatives, in particular, to Topramezone derivatives and uses thereof, and belongs to the technical field of pesticide compounds.

DESCRIPTION OF THE PRIOR ART

Farmland weeds refer to non-cultivated plants in farmland. From an ecological and economic perspective, under certain conditions, any plant that causes more harm than benefit can be considered a weed. The harm caused by weeds is manifested in competing with crops for water, nutrients, and sunlight, thereby affecting crop yield and quality. Many weeds are also intermediate hosts for pathogens and pests. Eliminating weeds is one of the key issues that modern agriculture needs to address. Herbicides play an important role in chemical control methods. According to statistics, in China alone, the annual weed-infested area in corn fields exceeds 23.33 million/$hm^2$ (350 million mu), and the damage caused by weeds results in a loss of up to 9.5 million tons (19 billion catties) of corn. The use of herbicides is the most economical and effective means of controlling weeds in corn fields. However, with the long-term and extensive use of herbicides, the types of herbicide-resistant weeds are gradually increasing.

Taking corn field weeds as an example, there are as many as 136 species of them. Among them, the dominant weeds are mainly *Digitaria sanguinalis, Amaranthus retroflexus, Echinochloa crusgalli, Portulaca oleracea* and so on. Using chemical herbicides remains an important measure for corn field weed control at present. The commonly used herbicides include Nicosulfuron, Acetochlor, Topramezone etc. However, Nicosulfuron and Atrazine have long residual periods in soil, and improper application very easily is very likely to have an adverse impact on subsequent crops and the environment. When the soil is dry, soil-applied herbicides such as Acetochlor have relatively poor control efficacy on weeds in corn fields. Moreover, with the increase in the number of years of use, issues like weed community succession and herbicide resistance become more severe. Topramezone has a relatively poor effect on sedge and a poor continuous-control ability for broadleaf weeds. It is recommended to be mixed with broadleaf weed herbicides such as Atrazine or Dicamba to enhance its effectiveness. However, this leads to an increase in application costs. In addition, although Topramezone possesses a certain degree of rainfastness, it is still not ideal. It can easily be washed away and carried off by rainwater due to rainfall, which affects its retention in the field and on plant leaves, leading to a weakened or even lost herbicidal effect. Therefore, the serious harm caused by herbicide-resistant weeds and the difficulty in controlling them, along with issues such as common herbicides' poor rainfastness and high application costs, have become major scientific challenges in corn production in China. There is an urgent need to develop new herbicide varieties that are green, efficient, low-risk, rain-fastness, and cost-effective.

To address the above issues, the inventor has made structural improvements to Topramezone, aiming to develop an innovative herbicide with better bioactivity against sedge and broadleaf weeds, enhanced rainfastness, and higher safety.

SUMMARY OF THE DISCLOSURE

The object of the present invention is to overcome the deficiencies in the above-mentioned prior art, and the present invention provides Topramezone derivatives and uses thereof.

To achieve the above object, the present invention adopts the following technical solutions:

1. A Topramezone derivative, or a chiral monomer or mixture thereof, or a cis-trans isomeric monomer or mixture thereof, or an agrochemically acceptable salt or solvate thereof. The Topramezone derivative is selected from:

Compound I, with a name of 1-((4-(3-(4,5-dihydroisoxazol-3-yl)-2-methyl-4-(methylsulfonyl)benzoyl)-1-methyl-1H-pyrazol-5-yl)oxy)ethyl methyl carbonate, and a structural formula of:

Compound II, with a name of 4-(3-(4,5-dihydroisoxazol-3-yl)-2-methyl-4-(methylsulfonyl)benzoyl)-1-methyl-1H-pyrazol-5-yl pivalate, and a structural formula of:

2. Use of the aforementioned Topramezone derivative, or the chiral monomer or mixture thereof, or the cis-trans isomeric monomer or mixture thereof, or the agrochemically acceptable salt or solvate thereof for controlling harmful plants.

Further preferably, the harmful plants include, but are not limited to: grassy weeds, sedge, and broadleaf weeds.

Further preferably, the grassy weeds include, but are not limited to: *Digitaria sanguinalis, Eleusine indica, Echinochloa crusgalli, Setaria viridis*, and *Chloris virgata*.

The sedge includes, but is not limited to: *Cyperus rotundus*;

The broadleaf weeds include, but are not limited to, *Portulaca oleracea, Abutilon theophrasti medicus, Amaranthus retroflexus, Chenopodium album, Acalypha australis, Commelina communis, Convolvulus arvensis, Cirsium setosum*, and *Eclipta prostrata*.

Further preferably, the harmful plants include, but are not limited to: *Setaria viridis, Chloris virgata, Cyperus rotundus, Portulaca oleracea, Amaranthus retroflexus, Chenopodium album, Acalypha australis, Commelina communis, Convolvulus arvensis, Cirsium setosum*, and *Eclipta prostrata*.

3. A pharmaceutical composition includes the aforementioned Topramezone derivative, or the chiral monomer or mixture thereof, or the cis-trans isomeric monomer or mixture thereof, or the agrochemically acceptable salt or solvate thereof.

4. Use of the aforementioned pharmaceutical composition in the preparation of a herbicide.

Preferably, the herbicide is used for preventing and controlling weeds in farmland.

Preferably, the herbicide is used for preventing and controlling weeds in corn fields.

Further preferably, the varieties of corn include, but are not limited to, conventional corn, waxy corn, and sweet corn.

5. A herbicide includes an active ingredient of the aforementioned Topramezone derivative, or the chiral monomer or mixture thereof, or the cis-trans isomeric monomer or mixture thereof, or the agrochemically acceptable salt or solvate thereof.

Preferably, the herbicide is formulated into any dosage form using the active ingredient and the allowed pesticide formulation adjuvants, including but not limited to wettable powder (WP), water dispersible granule (WG), suspension concentrate (SC), suspo-emulsion (SE), emulsion, oil in water (EW), micro-emulsion (ME), aqueous solution (AS), emulsifiable concentrate (EC), water soluble powder (SP), soluble concentrate (SL), granule (GR), capsule suspension (CS), and mixed formulations of CS and SC (ZC).

6. A herbicide includes the aforementioned pharmaceutical composition.

Preferably, the herbicide is formulated into any dosage form using the pharmaceutical composition and the allowed pesticide formulation adjuvants, including but not limited to wettable powder (WP), water dispersible granule (WG), suspension concentrate (SC), suspo-emulsion (SE), emulsion, oil in water (EW), micro-emulsion (ME), aqueous solution (AS), emulsifiable concentrate (EC), water soluble powder (SP), soluble concentrate (SL), granule (GR), capsule suspension (CS), and mixed formulations of CS and SC (ZC).

The present invention has the following benefits:

The inventor obtained Topramezone derivatives through extensive screening and experimentation. Compounds I and II of the present invention are modified Topramezone. Through laboratory rainfastness test, laboratory bioactivity efficacy test, and corn safety laboratory test, the inventor surprisingly found that through modifications to Topramezone, Compounds I and II of the present invention achieved unexpected effects, improving the defects of existing products. Their effects are primarily reflected in the following three aspects.

Laboratory rainfastness test: rainfastness performance refers to the ability of the herbicide spray droplets to dry quickly and penetrate into the leaf tissue, ensuring that the herbicide can still exert its bioactivity after rainfall. The inventor found that when Compounds I and II of the present invention were sprayed and then subjected to simulated rainfall for scouring 0.5 hour after application, there was little impact on the control efficacy of weeds. However, under the same experimental conditions, rainfall at 0.5 hour, 1.0 hour, and 3.0 hour after the application of Topramezone obviously affected its effect, while rainfall at 6.0 hour after application had a relatively small impact on it.

The inventor found that when simulated rainfall was carried out at intervals of 0.5 hour, 1.0 hour, and 3.0 hour after application, the efficacy of Compounds I and II of the present invention remained stable, indicating that Compounds I and II of the present invention have relatively good rainfastness performance.

Inspired by this discovery, the inventor further investigated the bioactivity efficacy and safety of the compounds of the present invention.

The research data from the bioactivity efficacy test show that Compound I of the present invention has a better control efficacy on the grassy weeds: *Setaria viridis*, and *Chloris virgata* than Topramezone, and its efficacy is approximately 1.5 times that of Topramezone. Compound I of the present invention has a similar control efficacy on *Digitaria sanguinalis, Eleusine indica* and *Echinochloa crusgalli* as Topramezone. Compound II of the present invention has a similar control efficacy on the grassy weeds: *Setaria viridis, Chloris virgata, Digitaria sanguinalis, Eleusine indica* and *Echinochloa crusgalli* as Topramezone.

Compound I of the present invention has a better control efficacy on the sedge weed: *Cyperus rotundus* than Topramezone. Compound II of the present invention has a similar control efficacy on the sedge weed: *Cyperus rotundus* as Topramezone.

Compound I of the present invention has a significantly better control efficacy on broadleaf weeds such as *Chenopodium album, Acalypha australis, Convolvulus arvensis, Amaranthus retroflexus, Commelina communis, Cirsium setosum*, and *Eclipta prostrata* than Topramezone, and its efficacy is approximately 2 times that of Topramezone. Compound I of the present invention has a significantly better control efficacy on the broadleaf weed: *Portulaca oleracea* than Topramezone, and its efficacy is approximately 3.8 times that of Topramezone. Compound I of the present invention has a similar control efficacy on the broadleaf weed: *Abutilon theophrasti medicus* as Topramezone. Compound II of the present invention has a similar control efficacy on broadleaf weeds such as *Chenopodium album, Acalypha australis, Convolvulus arvensis, Amaranthus retroflexus, Commelina communis, Cirsium setosum, Eclipta prostrata* and *Abutilon theophrasti medicus* as Topramezone. Compound II of the present invention has a better control efficacy on the broadleaf weed: *Portulaca oleracea* as Topramezone.

Compound I of the present invention has a better effect on some grassy weeds, sedge weeds, and broadleaf weeds than Topramezone, and has a similar control efficacy on other grassy weeds. It addresses the current issues with Topramezone, including its poor effect on sedge weeds, poor continuous-control ability for broadleaf weeds and poor rainfastness. Compound II of the present invention has a similar control efficacy on grassy weeds as Topramezone, has a slightly better effect on broadleaf weeds than Topramezone, and resolves the issue of Topramezone's poor rainfastness.

Corn safety laboratory test showed that Compounds I, II, and the control herbicide Topramezone exhibit high safety levels for corn, regardless of the variety, including conventional corn Zhengdan 958, waxy corn, and sweet corn.

In conclusion, Compounds I and II of the present invention can be used for killing farmland weeds in agricultural production, offering significant potential for practical application and widespread adoption.

DESCRIPTION OF EMBODIMENTS

The present invention is further elaborated by referring to the Examples below in conjunction with the drawings. It should be noted that the following description is only intended to explain the present invention and does not limit its content.

Example 1

The Preparation of Compound I

Take a 1 L three-necked flask, add Topramezone (21 g, 57.8 mmol) and 600 ml of acetonitrile (white insoluble). Under stirring, add potassium carbonate (16 g, 115.8 mmol) (yellow insoluble). Then, add 1-chloroethyl methyl carbonate (80196-03-8) (24 g, 173.2 mmol) and potassium iodide (0.96 g, 5.78 mmol) while stirring at room temperature. After the addition, heat the mixture to 85° C. and react for 5 hours. Monitor the reaction by thin-layer chromatography (TLC) (petroleum ether (PE):ethyl acetate (EA)=1:1, volume ratio) until the starting materials are completely consumed. Concentrate the mixture under reduced pressure. Then add 400 ml of dichloromethane (DCM) and 400 ml of water, and perform liquid-liquid extraction. Dry the organic phase with 10 g of anhydrous sodium sulfate. Concentrate the organic phase under reduced pressure. Finally, purify the product by column chromatography (PE:EA=1:1, volume ratio) to obtain 22.5 g of an off-white solid, with a yield of 84%.

Figure 1:
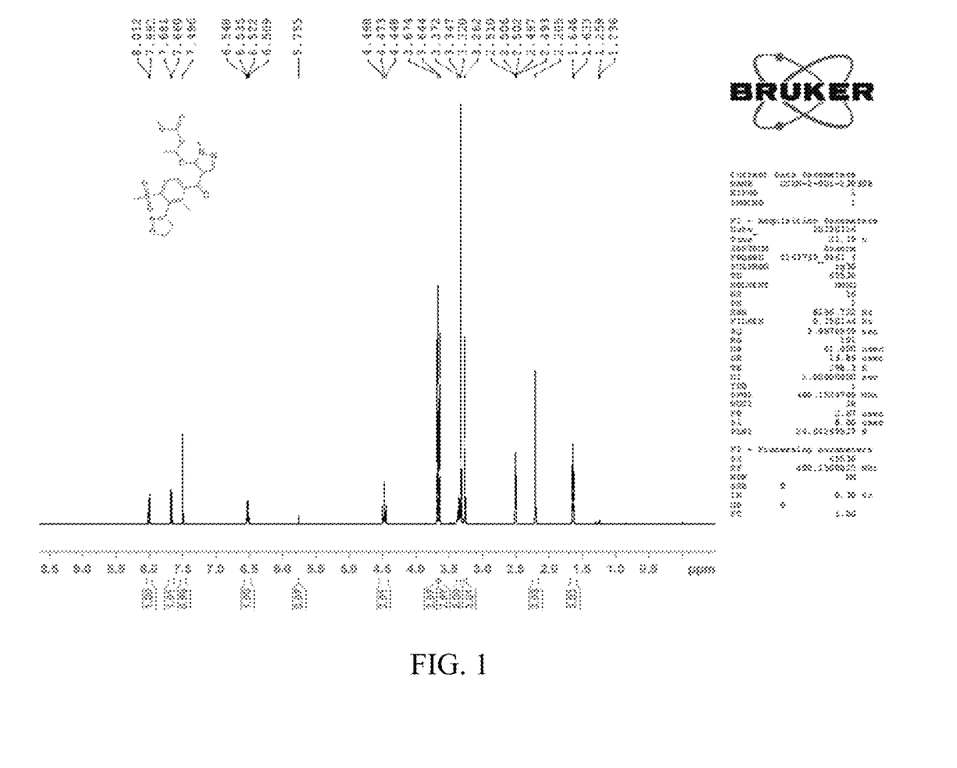
FIG. 1 shows the proton $^1$HNMR spectrum of Compound I.

$^1$H NMR (400 MHz, DMSO-d6), δ (ppm): 8.012 (d, J=8, 1H), 7.681 (d, J=8.4, 1H), 7.496 (s, 1H), 6.535 (m, 1H), 4.473 (t, J=10, 2H), 3.674 (s, 3H), 3.644 (s, 3H), 3.346 (t, J=10, 2H), 3.262 (s, 3H), 2.205 (s, 3H), 1.259 (d, J=9.2, 3H). $C_{20}H_{23}N_3O_8S[M+H^+]$=466.1297. (See FIG. 1 for proton $^1$HNMR spectrum)

Reaction formula is as follows:

Example 2

The Preparation of Compound II

Add Topramezone (10.00 g, 27.5 mmol) and 100 ml of dichloromethane (DCM) into a 250 ml three-necked flask and stir. Then add triethylamine (5.01 g, 49.5 mmol) and pivaloyl chloride (3.65 g, 30.3 mmol) at room temperature, and stir at room temperature for 3 hours. Monitor the reaction by TLC (DCM: methanol (MeOH)=10:1, volume ratio) until the starting materials are completely consumed. Wash the mixture once with 30 ml water and perform liquid-liquid extraction. Wash the organic phase once with 30 ml of saturated brine for extraction, add 10 g of anhydrous sodium sulfate to dry the organic phase, filter, and concentrate the mother liquor to obtain a yellow oily liquid. Add 40 ml of n-hexane to the yellow oily liquid, and a small amount of white solid will precipitate out. Concentrate the mixture to obtain a pale yellow solid. Then add 40 ml of n-hexane, perform ultrasonic treatment for 5 minutes, and stir (400 rpm) at room temperature for 16 hours. Perform suction filtration and wash with 10 ml of n-hexane, and dry by suction to obtain 11.8 g of a white solid with a yield of 96%.

Figure 2:
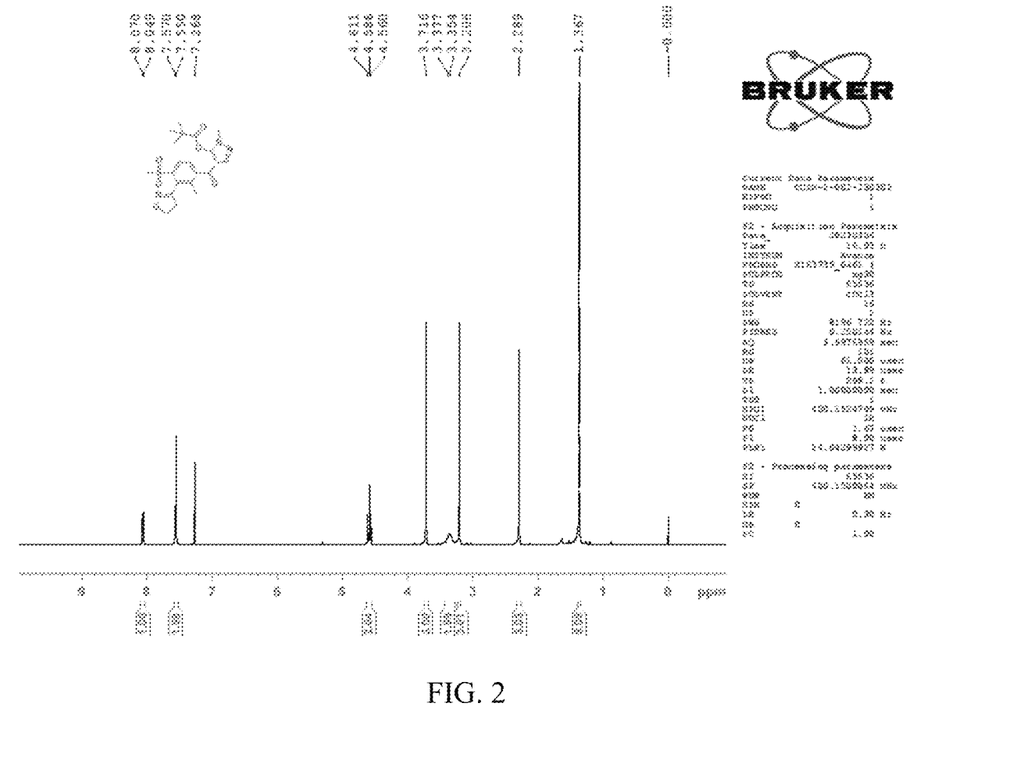
FIG. 2 shows the proton $^1$HNMR spectrum of Compound II.

$^1$H NMR (400 MHz, CDCl₃), δ (ppm): 8.070 (d, J=8.4, 1H), 7.570 (d, J=8, 2H), 4.586 (t, J=10.0, 2H), 3.716 (s, 3H), 3.377 (br, 2H), 3.206 (s, 3H), 2.289 (s, 3H), 1.367 (s, 9H). $C_{21}H_{25}N_3O_6S[M+H^+]$=448.1436. (See FIG. 2 for proton $^1$HNMR spectrum)

Reaction formula is as follows:

-continued

The Compound I of the present invention obtained in Example 1 and the Compound II of the present invention obtained in Example 2 as well as Topramezone (purchased from Zibo Yintai Pharmaceutical Technology Co., Ltd.) were respectively subjected to a laboratory rainfastness test, a laboratory bioactivity efficacy test, and a corn safety laboratory test. The specific method is as follows.

1. Laboratory Rainfastness Test 1.1 Test Basis

Refer to the "Pesticides guidelines for laboratory bioactivity tests Part 4: Foliar spray application test for herbicide activity, NY/T 1155.4-2006".

1.2 Test Conditions

The soil used for the test was a mixture of surface 20 cm loam and vermiculite, mixed in a volume ratio of 3:1 to form a culture soil. The test weeds were cultured in a glass greenhouse with a temperature ranging from 25° C. to 35° C. and under natural light.

1.3 Planting and Management of the Test Weeds and Crops

A measured quantity of *Digitaria sanguinalis* seeds were sown in plastic pots with a diameter of 9 cm, and covered with 1-2 mm of soil. The ports were then placed in enamel trays filled with water, and watered by bottom irrigation. After the water seeped to the soil surface, the pots were transferred to the glass greenhouse for standby.

1.4 Dosage of the Herbicide and Preparation of the Herbicide Solution

Five dosages were set for Compound I, Compound II and the control herbicide Topramezone, which were 3.75, 7.5, 15, 30 and 60 grams of active ingredient per hectare respectively. In addition, a blank control was also prepared.

The required amount of the herbicide was accurately measured out and directly added with water, which was diluted to the required dosage by using the serial dilution method for standby.

1.5 Treatment Design and Arrangement

The test was conducted on *Digitaria sanguinalis* at the two-leaf and one-heart stage, with the stems and leaves both sprayed uniformly. The ASS-4 automatic control spraying system with a fan-shaped nozzle was used indoors for herbicide application. Depending on the nozzle pressure and flow rate, 50 mL of herbicide solution was applied to a spraying area of 1.1 m² (which was equivalent to the water consumption of 30 L per mu). The system's operating speed was calibrated. The plastic pots to be treated were arranged evenly on the spraying platform to ensure uniform treatment. The spray pressure was set to 0.35 MPa, and the flow rate of the fan-shaped nozzle was set to 800 mL/min. The spraying was carried out in sequence from the low dosage to the high dosage. Each treatment was repeated four times.

The rainfastness test was set as follows: at 0.5 hours, 1.0 hour, 3.0 hours, and 6.0 hours after the application of the herbicide, the weeds that have already been sprayed with the herbicide were subjected to stem and leaf showering with a specific shower equipment simulating rainfall. Weeds that were not subjected to the showering treatment served as the control group.

The damage symptoms of the weeds (such as growth inhibition, chlorosis, malformation, etc.) were carefully recorded at 3, 7, 10, and 20 days after herbicide application. A visual comparison of the herbicide effectiveness was made after simulated rainfall at different time intervals. At 20 days post-application, the fresh weight of the aboveground parts of the weeds from each treatment group was measured, and the fresh weight control efficacy was calculated.

The treatment results were calculated according to the following formula: weed fresh weight control efficacy (%) = (control fresh weight−treatment fresh weight)/control fresh weight×100. A DPS statistical software was used to conduct regression analysis on the logarithmic values of the herbicide dosage and the probit values of the weed fresh weight control efficacy, and the correlation coefficient, $GR_{50}$, $GR_{90}$, and the 95% confidence interval were calculated.

1.6 Test Results and Analysis

Figure 3:
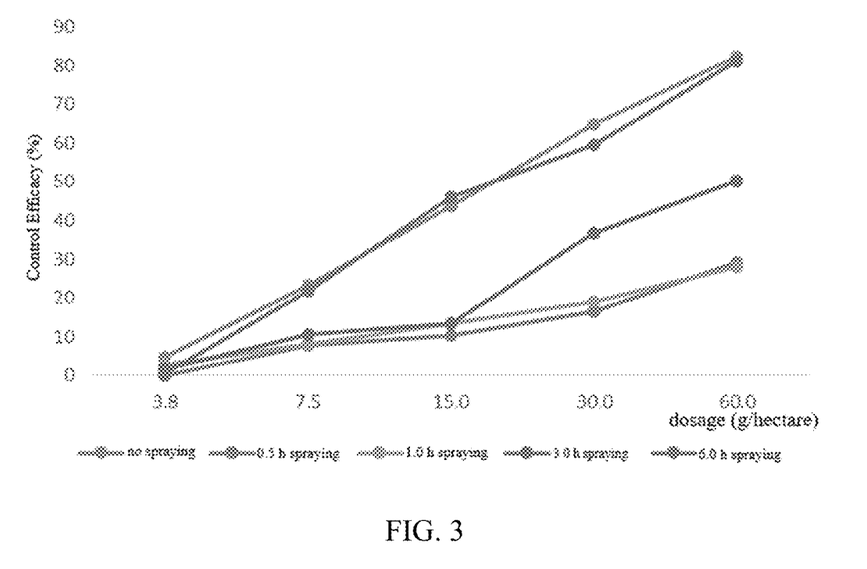
FIG. 3 shows the results of the rainfastness test for Topramezone.
Figure 4:
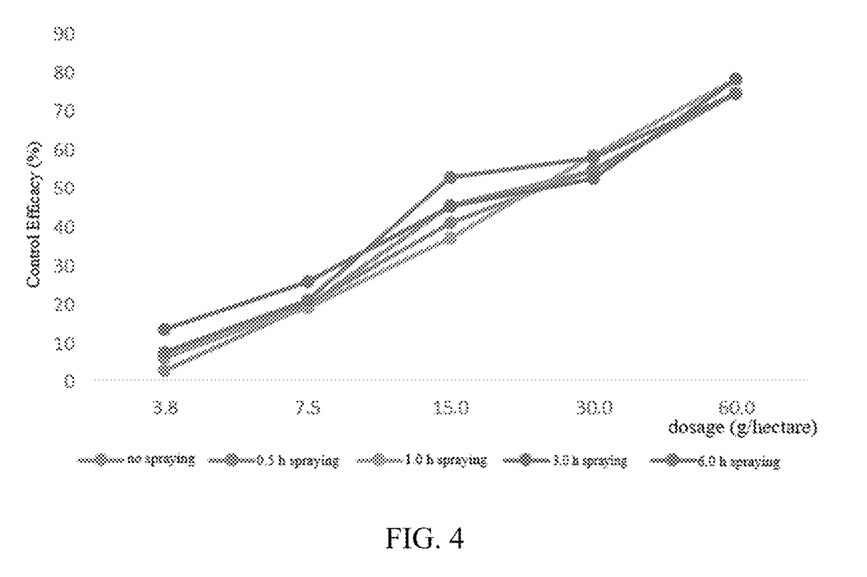
FIG. 4 shows the results of the rainfastness test for Compound I.
Figure 5:
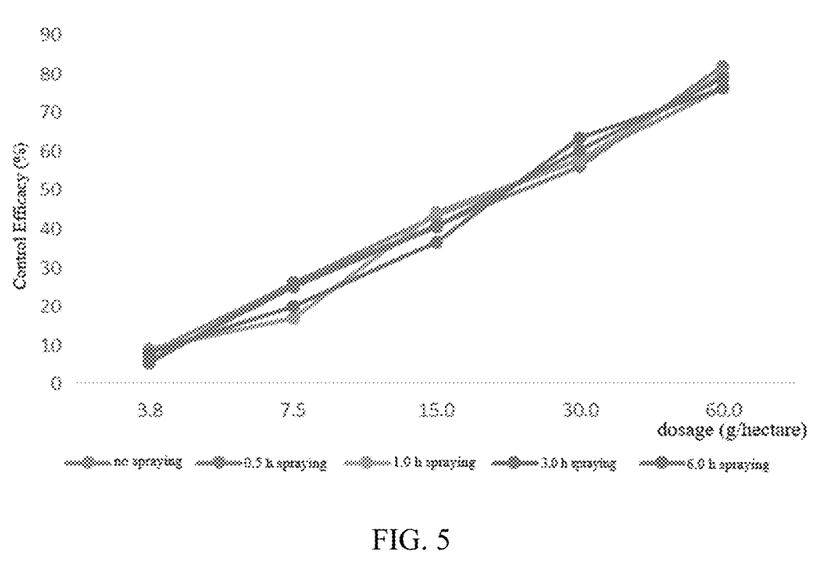
FIG. 5 shows the results of the rainfastness test for Compound II.

The rainfastness test results of the herbicides are shown in Table 1 and FIGS. 3, 4, and 5.

TABLE 1

Comparison of the Rainfastness of the Herbicides

| Treatment | Dosage (g/hectare) | Topramezone Average fresh weight (g) | Topramezone Control efficacy (%) | Compound I Average fresh weight (g) | Compound I Control efficacy (%) | Compound II Average fresh weight (g) | Compound II Control efficacy (%) |
|---|---|---|---|---|---|---|---|
| No spraying | 3.75 | 6.2 | 4.6 | 6.3 | 3.1 | 6.0 | 8.8 |
|  | 7.5 | 5.0 | 23.4 | 5.1 | 21.8 | 4.7 | 28.7 |
|  | 15 | 3.7 | 43.7 | 3.2 | 50.6 | 3.4 | 47.9 |
|  | 30 | 2.3 | 64.8 | 2.6 | 60.5 | 2.3 | 64.4 |
|  | 60 | 1.2 | 82.4 | 1.1 | 82.8 | 1.0 | 84.7 |
| Spraying water 0.5 hour after herbicide application | 3.75 | 6.5 | 0.0 | 6.1 | 6.9 | 6.2 | 5.7 |
|  | 7.5 | 6.0 | 7.7 | 5.1 | 22.2 | 4.6 | 29.1 |
|  | 15 | 5.9 | 10.3 | 3.6 | 45.6 | 3.6 | 45.2 |
|  | 30 | 5.5 | 16.5 | 2.6 | 60.9 | 2.5 | 62.1 |
|  | 60 | 4.6 | 29.1 | 1.1 | 82.8 | 0.6 | 90.8 |
| Spraying water 1.0 hour after herbicide application | 3.75 | 6.4 | 2.7 | 6.1 | 7.3 | 5.9 | 10.0 |
|  | 7.5 | 6.0 | 8.0 | 5.2 | 21.1 | 5.3 | 18.8 |
|  | 15 | 5.7 | 13.4 | 3.9 | 41.0 | 3.3 | 49.0 |
|  | 30 | 5.3 | 19.2 | 2.3 | 64.8 | 2.4 | 64.0 |
|  | 60 | 4.7 | 28.0 | 0.9 | 86.6 | 0.8 | 88.5 |

TABLE 1-continued

Comparison of the Rainfastness of the Herbicides

| Treatment | Dosage (g/hectare) | Topramezone Average fresh weight (g) | Topramezone Control efficacy (%) | Compound I Average fresh weight (g) | Compound I Control efficacy (%) | Compound II Average fresh weight (g) | Compound II Control efficacy (%) |
|---|---|---|---|---|---|---|---|
| Spraying water 3.0 hour after herbicide application | 3.75 | 6.4 | 1.5 | 5.6 | 14.9 | 6.0 | 8.8 |
|  | 7.5 | 5.8 | 10.7 | 4.7 | 28.7 | 5.1 | 22.2 |
|  | 15 | 5.7 | 13.4 | 3.3 | 50.2 | 3.9 | 40.6 |
|  | 30 | 4.1 | 36.8 | 2.7 | 58.2 | 2.0 | 70.1 |
|  | 60 | 3.3 | 50.2 | 0.9 | 86.6 | 1.0 | 84.7 |
| Spraying water 6.0 hour after herbicide application | 3.75 | 6.5 | 0.4 | 6.0 | 8.4 | 6.1 | 6.5 |
|  | 7.5 | 5.1 | 21.8 | 5.0 | 23.4 | 4.7 | 27.6 |
|  | 15 | 3.5 | 46.0 | 2.7 | 58.6 | 3.6 | 44.8 |
|  | 30 | 2.7 | 59.4 | 2.3 | 64.4 | 2.2 | 66.7 |
|  | 60 | 1.2 | 81.2 | 1.1 | 82.8 | 0.8 | 87.4 |
| CK | — | 6.5 | — | 6.5 | — | 6.5 | — |

It can be seen from Table 1 and FIGS. 3, 4, and 5 that when it rained 0.5 h, 1.0 h, and 3.0 h after the application of the herbicide, the control efficacy of Topramezone was significantly reduced, and the control efficacy was almost unaffected when it rained 6.0 h after the application. On the contrary, the control efficacy of Compounds I and II of the present invention was almost unaffected when it rained 0.5 h after the application.

Compared with Topramezone, Compounds I and II of the present invention demonstrate significantly better rainfastness, with only a small difference in rainfastness between Compounds I and II.

2. Laboratory Bioactivity Efficacy Test
2.1 Test on Various Grassy Weeds, Sedge and Broadleaf Weeds
2.1.1 Test Basis Refer to the "Pesticides guidelines for laboratory bioactivity tests Part 4: Foliar spray application test for herbicide activity, NY/T 1155.4-2006".

2.1.2 Test Weeds
grassy weeds: *Setaria viridis, Chloris virgata*;
sedge: *Cyperus rotundus*;
Broadleaf weeds: *Amaranthus retroflexus, Chenopodium album, Acalypha australis, Commelina communis, Convolvulus arvensis, Cirsium setosum*, and *Eclipta prostrata*.

2.1.3 Test Conditions

The soil used for the test was a mixture of surface 20 cm loam and vermiculite, mixed in a volume ratio of 3:1 to form a culture soil. The test corn was cultured in a glass greenhouse with a temperature ranging from 25° C. to 35° C. and under natural light.

2.1.4 Planting and Management of the Test Weeds

A measured quantity of weed seeds were sown in plastic pots with a diameter of 9 cm, and covered with 1-2 mm of soil. The ports were then placed in enamel trays filled with water, and watered by bottom irrigation. After sowing, the pots were transferred to the glass greenhouse for cultivation and growth.

2.1.5 Dosage of the Herbicide and Preparation of the Herbicide Solution

Five dosages were set for Compound I, Compound II and the control herbicide Topramezone, which were 3.75, 7.5, 15, 30 and 60 grams of active ingredient per hectare respectively. In addition, a blank control was also prepared.

The required amount of the herbicide was accurately measured out, an appropriate amount of emulsifier and organic solvent were added to dissolve the herbicide, and then a certain amount of water was added therein until the herbicide was diluted to the required dosage by using the serial dilution method for standby.

2.1.6 Herbicidal Efficacy Survey Method and Calculation Formula

The fresh weight of each treatment was surveyed 14 days after the application of the herbicide. The fresh weight control efficacy was calculated according to the following formula: fresh weight control efficacy (%)=(control fresh weight−treatment fresh weight)/control fresh weight×100.

A DPS statistical software was used to conduct regression analysis on the logarithmic values of the herbicide dosage and the probit values of the corn fresh weight control efficacy, and the correlation coefficient, $GR_{50}$, $GR_{90}$, and the 95% confidence interval were calculated.

2.1.7 Test Results and Analysis

Compound I, Compound II and the control herbicide Topramezone showed clear pesticidal efficacy symptoms on the test weeds. The fresh weight control efficacy was recorded 14 days after herbicide application, and the regression analysis was carried out on the logarithmic values of the herbicide dosage and the probit values of the weed fresh weight control efficacy by using the DPS statistical software. The results are shown in Table 2 and Table 3.

TABLE 2

The Control Efficacy Results of the Two New Compounds on grassy Weeds and sedge

| Target weed | Treatment | Regression Equation | Correlation Coefficient | $GR_{50}$ (g a.i./ha) | $GR_{90}$ (g a.i./ha) |
|---|---|---|---|---|---|
| *Setaria viridis* | 1 | y = 2.7884 + 3.3328x | 0.9790 | 3.96 (2.36-8.26) | 11.42 (7.46-29.71) |
|  | 2 | y = 2.8551 + 2.6282x | 0.9685 | 6.77 (4.07-9.10) | 19.04 (13.41-33.73) |
|  | 3 | y = 2.8180 + 2.6680x | 0.9695 | 6.72 (4.60-9.88) | 19.16 (9.42-34.03) |

TABLE 2-continued

The Control Efficacy Results of the Two New Compounds on grassy Weeds and sedge

| Target weed | Treatment | Regression Equation | Correlation Coefficient | $GR_{50}$ (g a.i./ha) | $GR_{90}$ (g a.i./ha) |
|---|---|---|---|---|---|
| Chloris virgata | 1 | y = 1.8778 + 4.34036x | 0.9646 | 2.25 (1.37-7.92) | 10.81 (4.30-20.21) |
| | 2 | y = 2.3809 + 3.4666x | 0.9423 | 4.41 (1.26-4.46) | 15.22 (4.76-18.66) |
| | 3 | y = 1.8946 + 4.0099x | 0.9600 | 3.33 (1.77-6.38) | 15.81 (6.22-17.10) |
| Cyperus rotundus | 1 | y = 3.2068 + 1.5650x | 0.9790 | 11.78 (10.36-25.16) | 29.57 (11.46-30.78) |
| | 2 | y = 3.2274 + 1.1425x | 0.9685 | 15.68 (5.07-15.80) | 39.11 (23.11-52.73) |
| | 3 | y = 3.3170 + 0.9958x | 0.9695 | 16.11 (6.00-19.07) | 39.22 (24.12-46.54) |

Note:
GR values in the table are represented as $GR_{50}$ (95% confidence interval), $GR_{90}$ (95% confidence interval)

TABLE 3

The Control Efficacy Results of the Two New Compounds on Broadleaf Weeds

| Target weed | Treatment | Regression Equation | Correlation Coefficient | $GR_{50}$ (g a.i./ha) | $GR_{90}$ (g a.i./ha) |
|---|---|---|---|---|---|
| Chenopodium album | 1 | y = 1.8588 + 4.8376x | 0.9924 | 1.22 (0.66-4.30) | 5.98 (4.53-13.91) |
| | 2 | y = 2.0755 + 4.0616x | 0.9423 | 2.83 (1.85-7.31) | 11.74 (9.34-22.32) |
| | 3 | y = 2.1448 + 3.9097x | 0.9229 | 3.22 (1.73-5.30) | 12.76 (8.90-23.37) |
| Acalypha australis | 1 | y = 2.5900 + 4.0076x | 0.9877 | 2.42 (2.32-8.03) | 7.55 (2.45-28.70) |
| | 2 | y = 2.9435 + 2.7011x | 0.9426 | 6.04 (2.99-7.14) | 16.46 (4.50-23.31) |
| | 3 | y = 2.5300 + 3.1736x | 0.9642 | 5.27 (4.35-9.11) | 16.92 (13.06-21.59) |
| Convolvulus arvensis | 1 | y = 1.0302 + 4.7336x | 0.9457 | 1.81 (0.78-9.89) | 31.82 (19.22-65.13) |
| | 2 | y = 1.4193 + 3.7742x | 0.9480 | 7.31 (3.86-8.12) | 58.43 (23.13-59.39) |
| | 3 | y = 1.1082 + 4.2619x | 0.9206 | 4.63 (2.17-11.09) | 66.46 (33.35-71.12) |
| Amaranthus retroflexus | 1 | y = 4.3480 + 3.0148x | 0.9432 | 2.86 (0.15-20.17) | 5.64 (0.24-15.20) |
| | 2 | y = 3.3516 + 2.7659x | 0.9455 | 4.64 (2.01-25.14) | 11.19 (4.65-29.88) |
| | 3 | y = 2.8802 + 3.2500x | 0.9181 | 4.05 (1.32-30.66) | 11.29 (2.83-30.90) |
| Commelina communis | 1 | y = 2.4794 + 3.2710x | 0.9899 | 4.98 (5.01-13.37) | 16.38 (10.25-41.23) |
| | 2 | y = 2.7694 + 1.8494x | 0.9398 | 13.73 (7.35-15.55) | 39.85 (10.54-40.55) |
| | 3 | y = 2.8636 + 1.6850x | 0.9204 | 14.38 (3.77-30.56) | 40.29 (15.76-49.13) |
| Cirsium setosum | 1 | y = 2.2538 + 3.3204x | 0.9852 | 5.56 (6.42-20.44) | 20.60 (20.55-45.21) |
| | 2 | y = 2.5166 + 2.0298 | 0.9401 | 15.14 (6.58-26.71) | 48.92 (4.31-50.21) |
| | 3 | y = 2.6006 + 1.8767x | 0.9617 | 15.89 (7.44-35.77) | 49.41 (25.22-57.84) |
| Eclipta prostrata | 1 | y = 1.8214 + 4.3416x | 0.9851 | 2.30 (1.55-24.58) | 11.62 (10.55-28.07) |
| | 2 | y = 1.8378 + 3.7696x | 0.9733 | 4.67 (2.01-15.89) | 23.27 (8.74-30.97) |
| | 3 | y = 2.2325 + 3.2115x | 0.9745 | 6.33 (2.89-10.14) | 23.72 (13.24-35.40) |

Note:
GR values in the table are represented as $GR_{50}$ (95% confidence interval), $GR_{90}$ (95% confidence interval)

It can be seen from Table 2 and Table 3 that Compound I of the present invention has a better control efficacy on the grassy weeds: *Setaria viridis*, and *Chloris virgata* than Topramezone, and its efficacy is approximately 1.5 times that of Topramezone. Compound I of the present invention has a better control efficacy on sedge: *Cyperus rotundus* than Topramezone. Moreover, Compound I of the present invention has a significantly better control efficacy on broadleaf weeds such as *Chenopodium album, Acalypha australis, Convolvulus arvensis, Amaranthus retroflexus, Commelina communis, Cirsium setosum*, and *Eclipta prostrata* than Topramezone, and its efficacy is approximately 2 times that of Topramezone.

It can be seen from Table 2 and Table 3 that Compound II of the present invention has a similar control efficacy on the grassy weeds: *Setaria viridis*, and *Chloris virgata* as Topramezone. Compound II of the present invention has a similar control efficacy on the sedge weed: *Cyperus rotundus* as Topramezone. Moreover, Compound II of the present invention has a similar control efficacy on broadleaf weeds such as *Chenopodium album, Acalypha australis, Convolvulus arvensis, Amaranthus retroflexus, Commelina communis, Cirsium setosum*, and *Eclipta prostrata* as Topramezone.

The control efficacy of Compound I of the present invention on the above-mentioned weeds is better than that of Topramezone. The control efficacy of Compound II of the present invention is equivalent to that of Topramezone. The control efficacy of Compound II is slightly lower than that of Compound I.

In this efficacy test, the inventor surprisingly found that the control efficacy of Compound I of the present invention on broadleaf weeds and sedge weeds was better than that of Topramezone.

2.2 Test on Other Grassy Weeds and Broadleaf Weeds 2.2.1 Test Weeds grassy weeds: *Digitaria sanguinalis, Eleusine indica, Echinochloa crusgalli*;

Broadleaf weeds: *Portulaca oleracea, Abutilon theophrasti medicus*.

2.2.2 Test Conditions

The soil used for the test was a mixture of surface 20 cm loam and vermiculite, mixed in a volume ratio of 3:1 to form a culture soil. The test weeds were cultured in a glass greenhouse with a temperature ranging from 25° C. to 35° C. and under natural light.

2.2.3 Planting and Management of the Test Weeds and Crops

Quantified seeds of *Digitaria sanguinalis, Eleusine indica, Echinochloa crusgalli, Portulaca oleracea*, and

*Abutilon theophrasti medicus* were sown in plastic pots with a diameter of 9 cm, and covered with 1-2 mm of soil. The ports were then placed in enamel trays filled with water, and watered by bottom irrigation. After the water seeped to the soil surface, the pots were transferred to the glass greenhouse for standby.

2.2.4 Dosage of the Herbicide and Preparation of the Herbicide Solution

Five dosages were set for Compound I, Compound II and the control herbicide Topramezone, which were 3.75, 7.5, 15, 30 and 60 grams of active ingredient per hectare respectively. In addition, a blank control was also prepared.

The required amount of the herbicide was accurately measured out and directly added with water, which was diluted to the required dosage by using the serial dilution method for standby.

2.2.5 Treatment Design and Arrangement

The test was conducted on grassy weeds at the two-leaf and one-heart stage, *Abutilon theophrasti medicus* at the 2-true-leaf stage, and *Portulaca oleracea* at the 3-5-leaf stage, with the stems and leaves both sprayed uniformly. The ASS-4 automatic control spraying system with a fan-shaped nozzle was used indoors for herbicide application. Depending on the nozzle pressure and flow rate, 50 mL of herbicide solution was applied to a spraying area of 1.1 $m^2$ (which was equivalent to the water consumption of 30 L per mu). The system's operating speed was calibrated. The plastic pots to be treated were arranged evenly on the spraying platform to ensure uniform treatment. The spray pressure was set to 0.35 MPa, and the flow rate of the fan-shaped nozzle was set to 800 mL/min. The spraying was carried out in sequence from the low dosage to the high dosage. Each treatment was repeated two to four times.

The herbicide was applied once. After spraying, the pots were air-dried for one day and then placed in the glass greenhouse. Regular watering was conducted to maintain moisture.

2.2.6 Weed Survey Method, Time and Frequency

The damage symptoms of the weeds (such as growth inhibition, chlorosis, malformation, etc.) were carefully recorded at 3, 7, 10, and 20 days after herbicide application. A visual comparison of the herbicide effectiveness was made. At 20 days post-application, the fresh weight of the aboveground parts of the weeds from each treatment group was measured, and the fresh weight control efficacy was calculated.

2.2.7 Herbicide Efficacy Calculation Method

The treatment results were calculated according to the following formula: weed fresh weight control efficacy (%)= (control fresh weight−treatment fresh weight)/control fresh weight×100.

A DPS statistical software was used to conduct regression analysis on the logarithmic values of the herbicide dosage and the probit values of the weed fresh weight control efficacy, and the correlation coefficient, $GR_{50}$, $GR_{90}$, and the 95% confidence interval were calculated.

2.2.8 Test Results and Analysis

Observations were made 3 to 7 days after the application of the herbicides. The grassy weeds and broadleaf weeds like *Portulaca oleracea* that were treated with Compound I, Compound II and the control herbicide Topramezone gradually became whitened and withered as they grew, and broadleaf weeds like *Abutilon theophrasti medicus* directly dried up and died.

Observations were made 10 days after the application of the herbicides. Compound I, Compound II and the control herbicide Topramezone showed excellent treatment effects, with most of the weeds dying.

Observations were made 20 days after the application of the herbicides. Most of the weeds treated with Compound I, Compound II and the control herbicide Topramezone dried up and died.

The control efficacy of Compound I, Compound II and the control herbicide Topramezone on grassy weeds and broadleaf weeds are shown in Tables 4 and 5. Treatment 1 is Compound I, treatment 2 is Compound II, and treatment 3 is the control herbicide Topramezone.

TABLE 4

The Control Efficacy of Compound I, Compound II and Control Herbicide Topramezone on grassy Weeds

| Target weed | Treatment | Regression Equation | Correlation Coefficient | $GR_{50}$ (g a.i./ha) | $GR_{90}$ (g a.i./ha) |
|---|---|---|---|---|---|
| *Digitaria sanguinalis* | 1 | y = 2.4247 + 2.4806x | 0.9788 | 10.92 (9.46-12.40) | 35.88 (30.54-43.91) |
|  | 2 | y = 2.5955 + 2.1902x | 0.9900 | 12.53 (10.85-14.32) | 48.19 (39.47-62.40) |
|  | 3 | y = 2.6838 + 2.3069x | 0.9679 | 10.09 (6.74-13.45) | 36.27 (25.90-64.36) |
| *Eleusine indica* | 1 | y = 4.2475 + 1.7361x | 0.9291 | 2.71 (1.42-4.04) | 14.85 (12.05-18.20) |
|  | 2 | y = 3.9682 + 1.7844x | 0.9904 | 3.79 (2.39-5.15) | 19.79 (16.50-24.39) |
|  | 3 | y = 4.2666 + 1.6708x | 0.9014 | 2.75 (1.45-4.09) | 16.07 (13.06-19.89) |
| *Echinochloa crusgalli* | 1 | y = 1.1877 + 4.8843x | 0.9939 | 6.03 (4.78-7.12) | 11.04 (9.80-12.14) |
|  | 2 | y = 1.7930 + 4.0705x | 0.9965 | 6.13 (4.86-7.24) | 12.64 (11.33-13.92) |
|  | 3 | y = 1.4821 + 4.3192x | 0.9653 | 6.52 (0.07-10.90) | 12.92 (3.45-21.46) |

Note:
GR values in the table are represented as $GR_{50}$ (95% confidence interval), $GR_{90}$ (95% confidence interval)

TABLE 5

The Control Efficacy of Compound I, Compound II and Control Herbicide Topramezone on Broadleaf Weeds

| Target weed | Treatment | Regression Equation | Correlation Coefficient | $GR_{50}$ (g a.i./ha) | $GR_{90}$ (g a.i./ha) |
|---|---|---|---|---|---|
| *Portulaca oleracea* | 1 | y = 3.0604 + 3.3283x | 0.9876 | 3.83 (2.36-5.16) | 9.29 (7.46-10.81) |
|  | 2 | y = 3.6438 + 1.8189x | 0.9758 | 5.57 (4.07-7.00) | 28.20 (23.41-35.73) |
|  | 3 | y = 3.3319 + 1.8991x | 0.9770 | 7.56 (6.00-9.07) | 35.74 (29.42-46.03) |

TABLE 5-continued

The Control Efficacy of Compound I, Compound II and
Control Herbicide Topramezone on Broadleaf Weeds

| Target weed | Treatment | Regression Equation | Correlation Coefficient | $GR_{50}$ (g a.i./ha) | $GR_{90}$ (g a.i./ha) |
|---|---|---|---|---|---|
| Abutilon theophrasti | 1 | y = 3.6614 + 2.6818x | 0.9490 | 3.16 (0.37-5.92) | 9.48 (4.30-13.21) |
| Medicago | 2 | y = 4.8801 + 1.5614x | 0.9239 | 1.19 (0.26-2.46) | 7.90 (4.76-10.66) |
|  | 3 | y = 4.3919 + 1.9978x | 0.9438 | 2.02 (0.77-3.38) | 8.83 (6.22-11.10) |

Note:
GR values in the table are represented as $GR_{50}$ (95% confidence interval), $GR_{90}$ (95% confidence interval)

It can be seen from Table 4 and Table 5 that Compound I of the present invention has a similar control efficacy on the grassy weeds: *Digitaria sanguinalis, Eleusine indica* and *Echinochloa crusgalli* as Topramezone, and the control efficacies of both Compound I and Topramezone are slightly better than that of the Compound II of the present invention. Compound I of the present invention has a significantly better control efficacy on the broadleaf weed: *Portulaca oleracea* than Topramezone, and its efficacy is approximately 3.8 times that of Topramezone. Compounds I and II of the present invention have a similar control efficacy on the broadleaf weed: *Abutilon theophrasti medicus* as Topramezone. Compound II of the present invention has a slightly better control efficacy on the broadleaf weed: *Portulaca oleracea* than Topramezone.

Compounds I and II of the present invention both have good control efficacies on the above-mentioned weeds. In general, the control efficacy of Compound I of the present invention on the above-mentioned weeds is better than that of Topramezone. The control efficacy of Compound II of the present invention on grassy weeds is equivalent to that of Topramezone, and the control efficacy of Compound II of the present invention on broadleaf weeds is slightly better than that of Topramezone.

3. Corn Safety Laboratory Test:

3.1 Test Crops

Three corn varieties: Zhengdan 958, white waxy corn, and sweet corn (Runhua sweet corn).

3.2 Test Conditions

The soil used for the test was a mixture of surface 20 cm loam and vermiculite, mixed in a volume ratio of 3:1 to form a culture soil. The test corn was cultured in a glass greenhouse with a temperature ranging from 25° C. to 35° C. and under natural light.

3.3 Planting and Management of Test Corn and Crops

A measured quantity of corn seeds were sown in plastic pots with a diameter of 15 cm, and covered with 2-3 cm of soil. The ports were then placed in enamel trays filled with water, and watered by bottom irrigation. After sowing, the pots were transferred to the glass greenhouse for cultivation and growth.

3.4 Dosage of the Herbicide and Preparation of the Herbicide Solution

In the corn safety test, dosages were set for the two Compounds (Compound I of the present invention and Compound II of the present invention) and the control herbicide Topramezone, which were 15, 30, 60, and 120 grams of active ingredient per hectare respectively. In addition, a blank control was also prepared.

The required amount of the herbicide was accurately measured out, an appropriate amount of emulsifier and organic solvent were added to dissolve the herbicide, and then a certain amount of water was added therein until the herbicide was diluted to the required dosage by using the serial dilution method for standby.

3.5 Treatment Design and Arrangement

Corn stems and leaves were uniformly sprayed at the 3-4-leaf stage.

The ASS-3 automatic control spraying system with a fan-shaped nozzle was used indoors for herbicide application. Depending on the nozzle pressure and flow rate, 50 mL of herbicide solution was applied to a spraying area of 1.1 $m^2$ (which was equivalent to the water consumption of 30 L per mu). The system's operating speed was calibrated. The plastic pots to be treated were arranged evenly on the spraying platform to ensure uniform treatment. The spray pressure was set to 0.35 MPa, and the flow rate of the fan-shaped nozzle was set to 800 mL/min. The spraying was carried out in sequence from the low dosage to the high dosage. Each treatment was repeated three times.

The herbicide was applied once. After spraying, the pots were air-dried for one day and then placed in the glass greenhouse. Regular watering was conducted to maintain moisture.

3.6 Crop Survey

After application of the herbicide, whether there were any phytotoxic symptoms in the corn for each treatment was recorded. If yes, the phytotoxicity symptoms and grade were recorded in detail. 15 days after application, the fresh weight of the corn in each treatment was measured and the fresh weight control efficacy was calculated to assess the safety of the herbicide on the corn.

3.7 Calculation Method

The treatment results were calculated according to the following formula: fresh weight control efficacy (%)=(control fresh weight−treatment fresh weight)/control fresh weight×100.

3.8 Test Results

Observations were made 3 to 7 days after the application of the herbicides. Both of the two test herbicides and the control herbicide, Topramezone, were visually found to be safe for corn, and the growth of corn was normal.

Observations were made 10 days after the application of the herbicides. The corn treated with the highest dosage (i.e., 120 grams of active ingredient per hectare) of the test herbicide of Compound I of the present invention was all normal. Both the test herbicide of Compound II of the present invention and the control herbicide Topramezone were safe for corn.

Observations were made 15 days after the application of the herbicides. The corn treated with the highest dosage of the test herbicide of Compound I of the present invention was all normal. The corn treated with the test herbicide of Compound II of the present invention and the control herbicide was basically growing normally. Overall, all three herbicides have a high level of safety for corn.

3.8.1 Safety of the Two New Compounds on Corn
(1) Safety of the Compounds on Conventional Corn Zhengdan 958 (Tables 6-1 to 6-3)

TABLE 6-1

Effect of Compound I on Fresh Weight of Corn (Zhengdan 958)

| Dosage of the Herbicide (g a.i./ha) | Corn Growth Status | Fresh Weight (g) | Fresh Weight Control Efficacy (%) |
|---|---|---|---|
| 15 | Good, Normal Growth | 15.0 | 0.8 |
| 30 | Good, Normal Growth | 15.1 | 0.0 |
| 60 | Good, Normal Growth | 15.4 | −1.7 |
| 120 | Good, Normal Growth | 14.9 | 1.8 |
| ck | Normal Growth | 15.1 | — |

TABLE 6-2

Effect of Compound II on Fresh Weight of Corn (Zhengdan 958)

| Dosage of the Herbicide (g a.i./ha) | Corn Growth Status | Fresh Weight (g) | Fresh Weight Control Efficacy (%) |
|---|---|---|---|
| 15 | Good, Normal Growth | 15.1 | 0.5 |
| 30 | Good, Normal Growth | 15.3 | −1.2 |
| 60 | Good, Normal Growth | 15.2 | −0.2 |
| 120 | Good, Normal Growth | 15.1 | 0.3 |
| ck | Normal Growth | 15.1 | — |

TABLE 6-3

Effect of Topramezone on Fresh Weight of Corn (Zhengdan 958)

| Dosage of the Herbicide (g a.i./ha) | Corn Growth Status | Fresh Weight (g) | Fresh Weight Control Efficacy (%) |
|---|---|---|---|
| 15 | Good, Normal Growth | 15.2 | −0.5 |
| 30 | Good, Normal Growth | 14.9 | 1.8 |
| 60 | Good, Normal Growth | 15.2 | −0.5 |
| 120 | Good, Normal Growth | 15.6 | −2.8 |
| ck | Normal Growth | 15.1 | — |

The growth of Zhengdan 958 corn treated with the highest dosage (i.e., 120 grams of active ingredient per hectare) of Compound I of the present invention was normal, without causing any phytotoxicity.

The growth of Zhengdan 958 corn treated with Compound II of the present invention, at all dosages, including the highest dosage of 120 grams of active ingredient per hectare, was normal, without causing any phytotoxicity.

Similar to Compound I of the present invention, the growth of Zhengdan 958 corn treated with the control herbicide Topramezone at all dosages was normal.

(2) Safety of the Compounds on White Waxy Corn (Tables 7-1 to 7-3)

TABLE 7-1

Effect of Compound I on Fresh Weight of Corn (White Waxy Corn)

| Dosage of the Herbicide (g a.i./ha) | Corn Growth Status | Fresh Weight (g) | Fresh Weight Control Efficacy (%) |
|---|---|---|---|
| 15 | Good, Normal Growth | 9.4 | 0.0 |
| 30 | Good, Normal Growth | 9.2 | 2.4 |
| 60 | Good, Normal Growth | 9.6 | −2.1 |
| 120 | Good, Normal Growth | 9.2 | 2.1 |
| ck | Normal Growth | 9.4 | — |

TABLE 7-2

Effect of Compound II on Fresh Weight of Corn (White Waxy Corn)

| Dosage of the Herbicide (g a.i./ha) | Corn Growth Status | Fresh Weight (g) | Fresh Weight Control Efficacy (%) |
|---|---|---|---|
| 15 | Good, Normal Growth | 9.8 | −3.4 |
| 30 | Good, Normal Growth | 9.6 | −2.1 |
| 60 | Good, Normal Growth | 9.7 | −2.4 |
| 120 | Good, Normal Growth | 9.1 | 3.7 |
| ck | Normal Growth | 9.4 | — |

TABLE 7-3

Effect of Topramezone on Fresh Weight of Corn (White Waxy Corn)

| Dosage of the Herbicide (g a.i./ha) | Corn Growth Status | Fresh Weight (g) | Fresh Weight Control Efficacy (%) |
|---|---|---|---|
| 15 | Good, Normal Growth | 9.7 | −2.7 |
| 30 | Good, Normal Growth | 9.4 | 0.3 |
| 60 | Good, Normal Growth | 9.5 | −0.3 |
| 120 | Good, Normal Growth | 9.0 | 4.5 |
| ck | Normal Growth | 9.4 | — |

The growth of white waxy corn treated with the highest dosage (i.e., 120 grams of active ingredient per hectare) of Compound I of the present invention and the control herbicide Topramezone was normal, without causing any phytotoxicity.

Compound II of the present invention at all dosages are safe to white waxy corn.

(3) Safety of the New Compounds on Sweet Corn (Tables 8-1 to 8-3)

TABLE 8-1

Effect of Compound I on Fresh Weight of Corn (Sweet Corn)

| Dosage of the Herbicide (g a.i./ha) | Corn Growth Status | Fresh Weight (g) | Fresh Weight Control Efficacy (%) |
|---|---|---|---|
| 15 | Good, Normal Growth | 7.4 | 0.3 |
| 30 | Good, Normal Growth | 7.5 | -1.4 |
| 60 | Good, Normal Growth | 7.6 | -2.0 |
| 120 | Good, Normal Growth | 7.8 | -4.7 |
| ck | Normal Growth | 7.4 | — |

TABLE 8-2

Effect of Compound II on Fresh Weight of Corn (Sweet Corn)

| Dosage of the Herbicide (g a.i./ha) | Corn Growth Status | Fresh Weight (g) | Fresh Weight Control Efficacy (%) |
|---|---|---|---|
| 15 | Good, Normal Growth | 7.5 | -0.7 |
| 30 | Good, Normal Growth | 7.3 | 1.7 |
| 60 | Good, Normal Growth | 7.6 | -2.7 |
| 120 | Good, Normal Growth | 7.6 | -2.7 |
| ck. | Normal Growth | 7.4 | — |

TABLE 8-3

Effect of Topramezone on Fresh Weight of Corn (Sweet Corn)

| Dosage of the Herbicide (g a.i./ha) | Corn Growth Status | Fresh Weight (g) | Fresh Weight Control Efficacy (%) |
|---|---|---|---|
| 15 | Good, Normal Growth | 7.6 | -2.0 |
| 30 | Good, Normal Growth | 7.4 | -0.3 |
| 60 | Good, Normal Growth | 7.4 | -0.3 |
| 120 | Good, Normal Growth | 7.3 | 1.0 |
| ck | Normal Growth | 7.4 | — |

The growth of sweet corn treated with the highest dosage (i.e., 120 grams of active ingredient per hectare) of Compound I of the present invention was normal, without causing any phytotoxicity.

Compound II of the present invention and the control herbicide Topramezone at all dosages are safe to sweet corn.

3.9 Conclusion

Overall, whether it is conventional corn Zhengdan 958, waxy corn or sweet corn, Compound I of the present invention, Compound II of the present invention and the control herbicide Topramezone all demonstrate high safety for the corn. Whether it is Zhengdan 958, waxy corn or sweet corn, they all grows normally under the test dosages, even under the dosage of 120 grams of active ingredient per hectare.

Although the specific embodiments of the present invention have been described with reference to the accompanying drawings, these descriptions are not intended to limit the scope of the invention. Based on the technical solutions of the present invention, various modifications or variations that can be made by those skilled in the art without creative effort are still within the scope of the present invention's protection.

The invention claimed is:

1. A Topramezone derivative or an agrochemically acceptable salt thereof, wherein the Topramezone derivative is:
   Compound I, with a name of 1-((4-(3-(4,5-dihydroisoxazol-3-yl)-2-methyl-4-(methylsulfonyl) benzoyl)-1-methyl-1H-pyrazol-5-yl)oxy)ethyl methyl carbonate, and a structural formula of:

2. A method for controlling harmful plants, comprising:
   applying the Topramezone derivative or the agrochemically acceptable salt thereof of claim 1 to the harmful plants, wherein the harmful plants comprise grassy weeds, sedge, and broadleaf weeds.

3. The method of claim 2, wherein the grassy weeds comprise *Digitaria sanguinalis, Eleusine indica, Echinochloa crusgalli, Setaria viridis*, and *Chloris virgata;*
   the sedge comprises *Cyperus rotundus*; and
   the broadleaf weeds comprise *Portulaca oleracea, Abutilon theophrasti Medicus, Amaranthus retroflexus, Chenopodium album, Acalypha australis, Commelina communis, Convolvulus arvensis, Cirsium setosum*, and *Eclipta prostrata*.

4. An agrochemical composition, comprising the Topramezone derivative or the agrochemically acceptable salt thereof of claim 1.

5. A method for controlling weeds, comprising:
   applying the agrochemical composition of claim 4 to the weeds.

6. The method of claim 5, wherein a locus is farmland.

7. The method of claim 6, wherein the locus is cornfield.

8. A herbicide, comprising an active ingredient which is the Topramezone derivative or the agrochemically acceptable salt thereof of claim 1.

9. A herbicide, comprising the agrochemical composition of claim 4 and agriculturally acceptable formulation adjuvants.

* * * * *